United States Patent
Takada et al.

(10) Patent No.: US 11,029,458 B2
(45) Date of Patent: Jun. 8, 2021

(54) POLARIZING PLATE AND OPTICAL APPARATUS INCLUDING THE SAME

(71) Applicant: Dexerials Corporation, Tokyo (JP)

(72) Inventors: Akio Takada, Tokyo (JP); Kazuyuki Shibuya, Tokyo (JP); Shigeshi Sakakibara, Tokyo (JP); Toshiaki Sugawara, Tokyo (JP); Yusuke Matsuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 165 days.

(21) Appl. No.: 16/145,716

(22) Filed: Sep. 28, 2018

(65) Prior Publication Data

US 2019/0094438 A1    Mar. 28, 2019

(30) Foreign Application Priority Data

Sep. 28, 2017 (JP) .............................. JP2017-188356
Oct. 27, 2017 (JP) .............................. JP2017-207869

(51) Int. Cl.
   *G02B 1/14* (2015.01)
   *G02B 5/30* (2006.01)
   *B32B 9/00* (2006.01)

(52) U.S. Cl.
   CPC .............. *G02B 5/3058* (2013.01); *B32B 9/00* (2013.01); *B32B 2307/412* (2013.01);
   (Continued)

(58) Field of Classification Search
   CPC .......... G02B 5/3058; G02B 1/14; G02B 5/30; G02B 1/18; B32B 2307/412;
   (Continued)

(56) References Cited

U.S. PATENT DOCUMENTS 5,556,667 A    9/1996   Teranishi et al.
RE45,642 E *   8/2015   Takada ................. G03B 21/008
                        (Continued)

FOREIGN PATENT DOCUMENTS

JP       3367572 B2     1/2003
JP    2006-507517 A     3/2006
                        (Continued)

OTHER PUBLICATIONS

Office Action issued in the counterpart Japanese Patent Application No. 2017-207869, dated Oct. 2, 2018 (3 pages).
(Continued)

*Primary Examiner* — Balram T Parbadia
(74) *Attorney, Agent, or Firm* — Osha Bergman Watanabe & Burton LLP

(57) ABSTRACT

To provide a polarizing plate and an optical apparatus capable of improving durability while maintaining excellent optical characteristics. Provided is a polarizing plate 1 with a wire grid structure, including: a transparent substrate 10; and a grid-shaped convex portion 11 which is arranged on the transparent substrate 10 at a pitch P shorter than a wavelength of light of a use band, extends in a predetermined direction, and includes a reflection layer 12 formed of a light reflective material, wherein a surface of the grid-shaped convex portion 11 and a surface of a bottom surface portion of a groove formed between the grid-shaped convex portions 11 are provided with a protection film 20 which covers the surfaces thereof and the protection film 20 is formed by two kinds or more of protection films including an organic film formed of an organic material.

3 Claims, 4 Drawing Sheets

(52) U.S. Cl.
CPC . *B32B 2307/416* (2013.01); *B32B 2307/7265* (2013.01); *B32B 2551/00* (2013.01); *G02B 1/14* (2015.01)

(58) Field of Classification Search
CPC ...... B32B 2307/416; B32B 2307/7265; B32B 2551/00; B32B 9/00
See application file for complete search history.

(56) References Cited

U.S. PATENT DOCUMENTS

| | | | |
|---|---|---|---|
| 2003/0227678 A1 | 12/2003 | Lines et al. | |
| 2008/0186576 A1 | 8/2008 | Takada | |
| 2009/0273728 A1 | 11/2009 | Song et al. | |
| 2010/0225886 A1* | 9/2010 | Kumai | G02B 5/3058 353/20 |
| 2012/0105745 A1 | 5/2012 | Kumai | |
| 2013/0128358 A1* | 5/2013 | Hanashima | G02B 5/3058 359/487.03 |
| 2013/0215507 A1* | 8/2013 | Sasaki | G02B 5/003 359/485.05 |
| 2013/0286358 A1* | 10/2013 | Takahashi | G02B 5/3008 353/20 |
| 2014/0063467 A1* | 3/2014 | Takahashi | G02B 5/3058 353/20 |
| 2015/0015948 A1* | 1/2015 | Takada | G02B 5/3058 359/485.05 |
| 2016/0170115 A1* | 6/2016 | Kim | G02B 5/3058 359/485.05 |
| 2016/0185119 A1 | 6/2016 | Uchiyama | |
| 2016/0289458 A1* | 10/2016 | Linford | C23C 16/24 |
| 2016/0291227 A1 | 10/2016 | Nielson et al. | |

FOREIGN PATENT DOCUMENTS

| | | |
|---|---|---|
| JP | 2008-216957 A | 9/2008 |
| JP | 2011-154303 A | 8/2011 |
| JP | 2012-027492 A | 2/2012 |
| JP | 2012-098469 A | 5/2012 |
| JP | 5333615 B2 | 11/2013 |
| JP | 2014-085516 A | 5/2014 |
| JP | 2014181350 A | 9/2014 |
| JP | 2015-047832 A | 3/2015 |
| WO | 2016/160766 A1 | 10/2016 |
| WO | 2017/073044 A1 | 5/2017 |

OTHER PUBLICATIONS

Office Action issued in corresponding Japanese Patent Application No. 2017-207869, dated Jan. 16, 2018 (5 pages).

Office Action issued in corresponding Japanese Patent Application No. 2017-207869, dated May 29, 2018 (4 pages).

Office Action issued in the counterpart Japanese Patent Application No. 2020-005441, dated Apr. 14, 2020 (5 pages.

* cited by examiner

POLARIZING PLATE AND OPTICAL APPARATUS INCLUDING THE SAME

BACKGROUND OF THE INVENTION

Field of the Invention

The present invention relates to a polarizing plate and an optical apparatus including the same.

Related Art

A polarizing plate is an optical element which absorbs polarized light in an absorption axis direction and transmits polarized light in a transmission axis direction orthogonal to the absorption axis direction. In recent years, in an optical apparatus such as a liquid crystal projector that requires heat resistance, a wire grid type inorganic polarizing plate has been used instead of an organic polarizing plate.

Among these, since an absorption type inorganic polarizing plate which includes a reflection layer, a dielectric layer, and an absorption layer in order from a transparent substrate has high durability, the polarizing plate is frequently used for a liquid crystal projector with high light density. These inorganic layers are formed by a physical film forming method or the like and a wire grid type polarizer pattern is formed in a submicron order by photolithography and dry etching techniques.

It is important for the polarizing plate to have low reflection from the viewpoint of optical characteristics. When the reflectance is high, an erroneous operation of a liquid crystal panel occurs or an image quality is degraded due to stray light. In recent years, a polarizing plate with lower reflection properties is desired in accordance due to high brightness and high definition of liquid crystal projectors.

Further, there is a case in which the polarizing plate is exposed to a high-humidity environment in practical use. In this case, oxidization or corrosion occurs in the polarizing plate and a bad influence on optical characteristics occurs. Accordingly, there is concern that two-dimensional distortion of display image, distortion of color, or the like may occur. For that reason, a polarizing plate with high durability is desired.

For example, there is proposed a polarizing plate which includes a dielectric layer and an absorption layer formed on a reflection layer and suppresses reflectance of a polarized wave (TE wave (S wave)) having an electric field component parallel to a grid extension direction by an absorption effect and an interference effect (for example, see Patent Document 1). In the polarizing plate, a protection layer is formed on an outermost layer to improve durability. Further, there is proposed a wire grid type polarizing plate in which an organic protection film including Si is formed on an outermost layer of the polarizing plate or a barrier film such as an Si oxide film is formed below the organic protection film (for example, see Patent Document 2).

Further, as a technique of forming a protection film such as a water-repellent film on an electronic device, various techniques are proposed. For example, as a technique of controlling a water-repellent film forming region, a technique of adjusting a water-repellent film forming solution application region and a solvent application region is proposed (for example, see Patent Document 3). Further, a technique of forming water-repellent films having different concentrations on a substrate surface is proposed (for example, see Patent Document 4).

Patent Document 1: Japanese Patent No. 5333615
Patent Document 2: U.S. Published Patent Application Publication, No. 2016/0291227, Specification
Patent Document 3: Japanese Patent No. 3367572
Patent Document 4: Japanese Unexamined Patent Application, Publication No. 2015-47832

SUMMARY OF THE INVENTION

However, in the polarizing plate disclosed in Patent Document 1 or 2, sufficient durability cannot be obtained. Further, the technique of Patent Document 3 is a technique for a window glass or mirror of an automobile and the technique of Patent Document 4 is a technique for an inkjet or the like and cannot be easily applied to a small pattern of a sub-micron order like the wire grid type polarizing plate.

The invention has been made in view of the above-described circumstances and an object of the invention is to provide a polarizing plate and an optical apparatus capable of improving durability while maintaining excellent optical characteristics.

(1) In order to achieve the above-described object, an aspect of the invention provides a polarizing plate (for example, a polarizing plate 1 to be described later) with a wire grid structure, including: a transparent substrate (for example, a transparent substrate 10 to be described later); and a grid-shaped convex portion (for example, a grid-shaped convex portion 11 to be described later) which is arranged on the transparent substrate at a pitch (for example, a pitch P to be described later) shorter than a wavelength of light of a use band, extends in a predetermined direction, and includes a reflection layer (for example, a reflection layer 12 to be described later) formed of a light reflective material, in which a surface of the grid-shaped convex portion and a surface of a bottom surface portion of a groove formed between the grid-shaped convex portions are provided with a protection film (for example, a protection film 20 to be described later) covering the surfaces thereof and the protection film is formed by two kinds or more of protection films including an organic film formed of an organic material.

(2) In the polarizing plate of (1), the protection film may include a first protection film (for example, a first protection film 21 to be described later) which is formed to cover a surface of the reflection layer and a second protection film (for example, a second protection film 22 to be described later) which is formed to cover a surface of the bottom surface portion of the groove and is formed by the organic film.

(3) In the polarizing plate of (2), the grid-shaped convex portion may include the reflection layer and an absorption layer (for example, an absorption layer 13 to be described later) including a light absorption material in order from the transparent substrate and the protection film may further include a third protection film (for example, a third protection film 23 to be described later) formed to cover a surface of the absorption layer and formed by the organic film.

(4) In the polarizing plate of (3), the absorption layer may be formed by a mixed layer of a light absorption material and a dielectric material by further including the dielectric material.

(5) In the polarizing plate of (3), the absorption layer may be formed by a dielectric layer which is formed on the reflection layer and is formed of a dielectric material and a light absorption layer which is formed on the dielectric layer and is formed of a light absorption material.

(6) In the polarizing plate of any one of (3) to (5), the first protection film may be formed by a phosphonic acid-based water-repellent film.

(7) In the polarizing plate of any one of (3) to (5), the first protection film may be formed by an aluminum-based oxide film.

(8) In the polarizing plate of any one of (3) to (7), the second protection film may be formed by an organic silane water-repellent film.

(9) In the polarizing plate of any one of (3) to (8), the second protection film and the third protection film may be formed of the same material.

(10) Another aspect of the invention provides an optical apparatus including the polarizing plate according to any one of (1) to (9).

According to the invention, it is possible to provide a polarizing plate and an optical apparatus capable of improving durability while maintaining excellent optical characteristics.

DETAILED DESCRIPTION OF THE INVENTION

Figure 1:
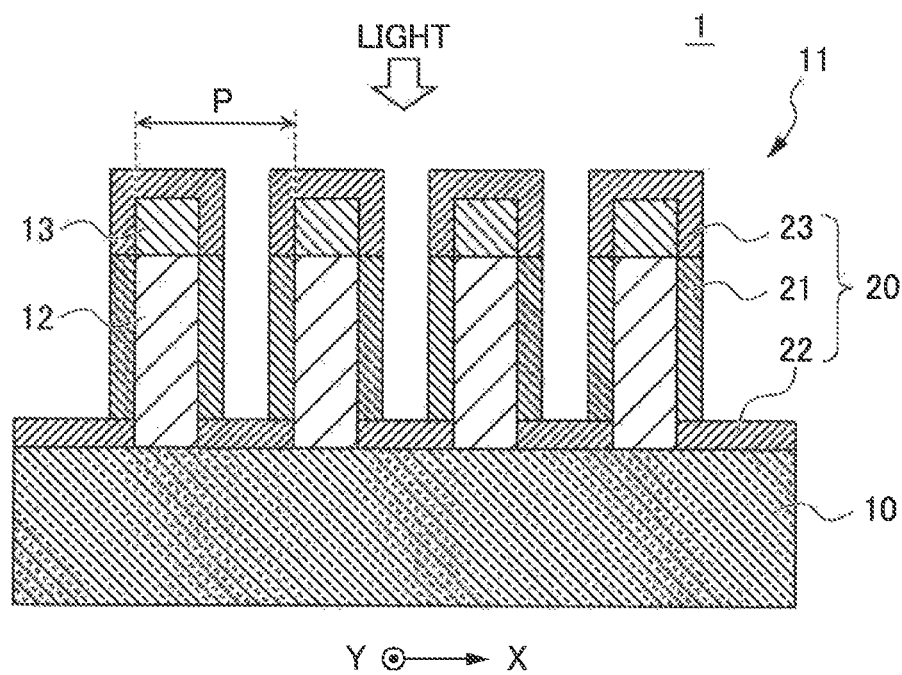
FIG. 1 is a cross-sectional schematic diagram illustrating a polarizing plate according to a first embodiment of the invention.

Hereinafter, embodiments of the invention will be described in detail with reference to the drawings. Additionally, in the description from the second embodiment, the same or equivalent reference numerals will be given to the same components as those of the first embodiment and a description thereof will be omitted.

First Embodiment

Polarizing Plate

A polarizing plate according to a first embodiment of the invention is an inorganic polarizing plate with a wire grid structure including a transparent substrate and a grid-shaped convex portion arranged on the transparent substrate at a pitch (period) shorter than a wavelength of light of a use band and extending in a predetermined direction. The grid-shaped convex portion includes a reflection layer and an absorption layer in order from the transparent substrate. Further, the polarizing plate according to the first embodiment includes a protection film which covers a surface of the grid-shaped convex portion and a surface of a bottom surface portion of a groove formed between the grid-shaped convex portions.

FIG. 1 is a cross-sectional schematic diagram illustrating a polarizing plate 1 according to the first embodiment. As illustrated in FIG. 1, the polarizing plate 1 includes a transparent substrate 10 which is transparent to light of a use band and a grid-shaped convex portion 11 arranged on one surface of the transparent substrate 10 at a pitch P shorter than a wavelength of light of a use band. The grid-shaped convex portion 11 includes a reflection layer 12 and an absorption layer 13 in order from the transparent substrate 10. That is, the polarizing plate 1 has a wire grid structure in which the grid-shaped convex portion 11 formed by laminating the reflection layer 12 and the absorption layer 13 in order from the transparent substrate 10 is arranged in a one-dimensional grid shape on the transparent substrate 10.

Here, as illustrated in FIG. 1, the extension direction of the grid-shaped convex portion 11 (a predetermined direction) will be referred to as the Y-axis direction. Further, a direction which is orthogonal to the Y-axis direction and in which the grid-shaped convex portion 11 is arranged along a main surface of the transparent substrate 10 will be referred to as the X-axis direction. In this case, light which is incident to the polarizing plate 1 is appropriately incident from a direction orthogonal to the X-axis direction and the Y-axis direction at a position provided with the grid-shaped convex portion 11 in the transparent substrate 10.

The polarizing plate 1 attenuates the polarized wave (TE wave (S wave)) having an electric field component parallel to the Y-axis direction and transmits the polarized wave (TM wave (P wave)) having an electric field component parallel to the X-axis direction by using four functions of transmission, reflection, interference, and selective light absorption of polarized waves by optical anisotropy. Thus, the Y-axis direction is the direction of the absorption axis of the polarizing plate 1 and the X-axis direction is the direction of the transmission axis of the polarizing plate 1.

The light which is incident from a position provided with the grid-shaped convex portion 11 in the polarizing plate 1 is attenuated while being partially absorbed when passing through the absorption layer 13. In the light which is transmitted through the absorption layer 13, the polarized wave (TM wave (P wave)) is transmitted through the reflection layer 12 with high transmittance. Meanwhile, in the light which is transmitted through the absorption layer 13, the polarized wave (TE wave (S wave)) is reflected by the reflection layer 12. When the TE wave which is reflected by the reflection layer 12 passes through the absorption layer 13, a part of the TE wave is absorbed and reflected to be returned to the reflection layer 12. Further, when the TE wave which is reflected by the reflection layer 12 passes through the absorption layer 13, the TE wave is attenuated by interference. When the polarizing plate 1 selectively attenuates the TE wave as described above, desired polarizing characteristics can be obtained.

As illustrated in FIG. 1, the grid-shaped convex portion 11 is formed in a rectangular shape as viewed from the Y-axis direction (the predetermined direction) corresponding to the extension direction of each one-dimensional grid, that is, in a cross-sectional view orthogonal to the predetermined direction. In the polarizing plate 1 of the embodiment, a front end portion of the grid is formed by the rectangular absorption layer 13 and a leg portion of the grid is formed by the rectangular reflection layer 12.

Here, an interval in the X-axis direction of the grid-shaped convex portion 11 when the polarizing plate 1 is viewed from the Y-axis direction following the extension direction of the grid-shaped convex portion 11 will be referred to as a pitch P. The pitch P of the grid-shaped convex portion 11 is not particularly limited as long as the pitch is shorter than the wavelength of light of a use band. From the viewpoint of ease of production and stability, the pitch P of the grid-shaped convex portion 11 is preferably, for example, 100 nm to 200 nm. The pitch P of the grid-shaped convex portion 11 can be measured by the observation using a scanning electron microscope or a transmission electron microscope. For example, the pitch P is measured at four arbitrary positions by using the scanning electron microscope or the transmission electron microscope and the arithmetic mean value thereof can be set to the pitch P of the grid-shaped convex portion 11.

The transparent substrate 10 is not particularly limited as long as the substrate has translucency for the light of a use band and can be appropriately selected in accordance with a purpose. The "translucency for the light of a use band" does not mean that the transmittance of the light of a use band is 100% and may be the translucency capable of keeping the function as the polarizing plate. As the light of a use band, for example, visible light having a wavelength of about 380 nm to 810 nm can be exemplified.

The shape of the main surface of the transparent substrate 10 is not particularly limited and a shape (for example, a rectangular shape) is appropriately selected according to a purpose. An average thickness of the transparent substrate 10 is preferably, for example, 0.3 mm to 1 mm.

As a material forming the transparent substrate 10, a material having a refractive index of 1.1 to 2.2 is preferable and glass, crystal, sapphire, or the like can be exemplified. From the viewpoint of cost and transmittance, glass, particularly, quartz glass (a refractive index of 1.46) or soda lime glass (a refractive index of 1.51) is preferably used. The composition of the components of the glass material is not particularly limited and, for example, an inexpensive glass material such as silicate glass widely distributed as optical glass can be used.

Further, from the viewpoint of thermal conductivity, crystal or sapphire having high thermal conductivity is preferably used. Accordingly, since high light resistance against strong light is obtained, the polarizing plate is preferably used as a polarizing plate for an optical engine of a projector with a large heat generation amount.

Further, when a transparent substrate formed of optically active crystals such as crystal is used, it is preferable to dispose the grid-shaped convex portion 11 in a direction parallel to or perpendicular to the optical axis of the crystal. Accordingly, excellent optical characteristics can be obtained. Here, the optical axis indicates a direction axis in which a difference in refractive index between O (ordinary ray) and E (extraordinary ray) of the light traveling in that direction becomes minimal.

The reflection layer 12 is formed on the transparent substrate 10 and a metal film extending in a band shape is arranged in the Y-axis direction corresponding to the absorption axis. More specifically, the reflection layer 12 vertically extends from the transparent substrate 10. The reflection layer 12 has a function of a wire grid type polarizer and is used to attenuate the polarized wave (TE wave (S wave)) having an electric field component parallel to the longitudinal direction of the reflection layer 12 and to transmit the polarized wave (TM wave (P wave)) having an electric field component orthogonal to the longitudinal direction of the reflection layer 12.

A material forming the reflection layer 12 is not particularly limited as long as it is a light reflective material that is reflective for the light of a use band. For example, a single element such as Al, Ag, Cu, Mo, Cr, Ti, Ni, W, Fe, Si, Ge, and Te or an alloy including one or more of these elements can be exemplified. Among these, the reflection layer 12 is preferably formed of aluminum or aluminum alloy. Additionally, in addition to these metal materials, for example, an inorganic film or a resin film other than a metal formed with a high surface reflectance may be used to form the reflection layer 12 by coloring or the like. The film thickness of the reflection layer 12 is not particularly limited and is preferably, for example, 100 nm to 300 nm. In the embodiment, the width of the reflection layer 12 is set to be the same as the width of the absorption layer 13.

The absorption layer 13 is formed on the reflection layer 12 and is arranged to extend in a band shape in the Y-axis direction corresponding to the absorption axis. As the material forming the absorption layer 13, one or more light reflective materials which have a light absorbing action and in which an extinction constant of an optical constant is not zero like a metal material, a semiconductor material or the like can be exemplified and these materials are appropriately selected depending on the wavelength range of light to be applied. As the metal material, a single element such as Ta, Al, Ag, Cu, Au, Mo, Cr, Ti, W, Ni, Fe, and Sn or an alloy including at least one of these elements can be exemplified. Further, as the semiconductor material, Si, Ge, Te, ZnO, and silicide materials (β-FeSi2, MgSi2, NiSi2, BaSi2, CrSi2, CoSi2, TaSi, and the like) can be exemplified. By using these materials, the polarizing plate 1 can obtain a high extinction ratio with respect to the visible light range to be applied. Among these, it is preferable that the absorption layer 13 include Fe or Ta and further include Si.

When the semiconductor material is used as the absorption layer 13, the band gap energy of the semiconductor is involved in the absorption action and hence the band gap energy needs to be equal to or smaller than the use band. For example, when the material is used in visible light, it is necessary to use a material having absorption at a wavelength of 400 nm or more, that is, a material having a band gap of 3.1 eV or less.

The film thickness of the absorption layer 13 is not particularly limited and is preferably, for example, 10 nm to 100 nm. The absorption layer 13 can be formed as a high-density film by a sputtering method or a vapor deposition method.

Further, the absorption layer 13 may be formed by a mixed layer of the light absorption material and the dielectric material. Since it is possible to change light absorbency by changing a mixing ratio between the light absorption material and the dielectric material, it is possible to suppress light reflectance. The light absorption material and the dielectric material may be uniformly mixed in the film thickness direction or may be formed so that a mixing ratio (content ratio) thereof changes in the film thickness direction. The composition gradient at this time may be a linearly changing one or a nonlinearly changing one (for example, stepwise). It is preferable to form the absorption layer 13 so that the content ratio of the light absorption material increases as it goes away from the reflection layer 12. Accordingly, it is possible to decrease the absorption axis reflectance Rs of the polarizing plate 1 and to increase the transmission axis transmittance Tp thereof.

The above-described examples can be mentioned as the light absorption material. Then, as the dielectric material, general materials like Si oxide such as SiO2, metal oxide such as Al2O3, beryllium oxide, and bismuth oxide, MgF2, cryolite, germanium, titanium dioxide, silicon, magnesium fluoride, boron nitride, boron oxide, tantalum oxide, carbon, or a combination thereof can be exemplified. Among these, Si oxide is preferably used as the dielectric material.

Since the polarizing plate 1 is an inorganic polarizing plate with the above-described fine wire grid structure, the polarizing plate is easily influenced by a use environment. Accordingly, there is a need to improve durability such as oxidization resistance and moisture resistance. For that reason, the polarizing plate 1 includes a protection film 20 that covers the surface of the grid-shaped convex portion 11 and the surface of the bottom surface portion of the groove formed between the grid-shaped convex portions 11 in order to improve durability. The protection film 20 is formed by two or more kinds of protection films including an organic film formed of an organic material. Specifically as illustrated in FIG. 1, the protection film 20 includes a first protection film 21, a second protection film 22, and a third protection film 23.

The first protection film 21 is formed to cover the surface of the reflection layer 12. More specifically, the first protection film 21 is formed to cover the side surface of the reflection layer 12 forming the side surface portion of the groove formed between the grid-shaped convex portions 11. The first protection film 21 is formed by a film formed of an organic material or an inorganic material. Specifically, as the first protection film 21, a phosphonic acid-based water-repellent film or an aluminum-based oxide film is preferably used.

As the phosphonic acid-based water-repellent film, a water-repellent film formed of perfluoro-n-octylphosphonic acid (FOPA) or a water-repellent film formed of octadecylphosphonic acid (ODPA) is preferably exemplified. The phosphonic acid-based water-repellent film can be formed by chemical vapor deposition (CVD), atomic layer deposition (ALD), dipping, or the like.

Further, as the aluminum-based oxide film, an alumina film is preferably exemplified. The aluminum-based oxide film can form an alumina film on the surface thereof by heat-treating the reflection layer 12 formed of aluminum. This aluminum oxide film has a function of protecting the surface of the reflection layer 12 by preventing the oxidization thereof although the film is not water-repellent.

The second protection film 22 is formed to cover the surface of the bottom surface portion of the groove formed between the grid-shaped convex portions 11. More specifically, the protection film is formed to cover the surface of the transparent substrate 10 forming the bottom surface portion of the groove and the side surface of the end portion on the side of the transparent substrate 10 in the reflection layer 12. The second protection film 22 is formed by an organic film formed of an organic material. Specifically, as the second protection film 22, an organic silane-based water-repellent film formed of an organic silane-based material is preferably used. Among these, perfluorodecyltriethoxysilane (FDTS) of a fluorine-based silane compound and octadecyltrichlorosilane (OTS) of a nonfluorine-based silane compound are preferably used.

When glass is used as the transparent substrate 10 forming the bottom surface portion of the groove, the organic silane-based water-repellent film is formed while strongly adhering to the glass substrate through self-organization by the bonding of Si and O. For example, since the refractive index of the FDTS is about 1.4 in visible light to be close to the refractive index of glass, there is no bad influence on optical characteristics. The second protection film 22 can be formed by CVD, ALD, dipping, or the like.

The third protection film 23 is formed to cover the surface of the absorption layer 13. More specifically, the protection film is formed to cover the surface and the side surface of the absorption layer 13 forming the front end portion of the grid. The third protection film 23 is formed by an organic film formed of an organic material. Specifically, as the third protection film 23, similarly to the second protection film 22, the organic silane-based water-repellent film formed of the organic silane-based material is preferably used. Among these, FDTS of a fluorine-based silane compound and OTS of a nonfluorine-based silane compound are preferably used. The third protection film 23 can be formed by CVD, ALD, dipping, or the like. The third protection film 23 of the embodiment is preferably formed of the same material as that of the second protection film 22.

Here, the water repellency at the time of forming an FDTS film on each of the surfaces of the reflection layer 12 formed of aluminum, the absorption layer 13 formed of (Fe5%) Si, and the transparent substrate 10 (that is, the bottom surface portion of the groove) formed of SiO2 will be described. Specifically, the water repellency at the time of forming an FDTS film on each of these surfaces by a CVD method was evaluated by measuring a contact angle by the following measurement condition. The evaluation result is illustrated in Table 1.

Contact Angle Measurement Condition

Measurement Device: "DM 700R" manufactured by Kyowa Interface Science Co., Ltd. Measurement Condition: Droplet Method (liquid: water, liquid volume: 2 to 3 µl, waiting time to measurement: 1 second)
Analysis Method: θ/2

TABLE 1

| | Contact Angle (°) | | |
|---|---|---|---|
| | Before FDTS Treatment | After FDTS Treatment | After Annealing Treatment at 300° C. |
| Aluminum | 55.7 | 114.4 | 7.5 |
| (Fe5%)Si | 8.5 | 113.4 | 118.1 |
| SiO$_2$ | 8.8 | 113.9 | 112.9 |

In Table 1, "Before FDTS Treatment" means a state before the FDTS is formed, "After FDTS Treatment" means a state after the FDTS film is formed, and "After Annealing Treatment at 300° C." means a state where an annealing treatment is performed at 300° C. after forming the FDTS film. Further, the contact angle (°) of Table 1 shows a measurement result according to the above-described contact angle measurement condition.

As obvious from the result of Table 1, it is found that the water repellency is greatly improved in that the contact angle increases drastically by forming the FDTS film on the surface of any one of aluminum, (Fe 5%), Si, and SiO2. Further, it is found that high durability (heat resistance) is obtained since high water repellency is maintained even after the heat treatment at a high temperature for any one of (Fe 5%) Si and SiO2.

In contrast, aluminum exhibits high water repellency immediately after forming the FDTS film. However, when a heat treatment is performed at a high temperature, the water repellency greatly decreases and the water repellency decreases as compared with a case before the FDTS treatment. This is because the adhesion between the aluminum surface and the FDTS film is low. Accordingly, it is considered that the FDTS film is peeled due to the heat treatment at a high temperature and the aluminum surface is oxidized so that an alumina film is formed. From this result, it is possible to check that high durability cannot be obtained even when the FDTS film is formed on the surface of the reflection layer 12 formed of aluminum. As a countermeasure, a method of coating a silica film on the polarizing plate before forming the FDTS is considered. However, in this case, the film thickness of the polarizing plate increases. Then, since the optical performance of the polarizing plate is degraded due to the light scattering or the like, this countermeasure is not preferable.

Here, in the embodiment, the type of the protection film 20 is changed in response to the material forming the protection film 20 and at least two kinds or more of the protection films are formed on the outermost layer of the polarizing plate 1. More specifically, as described above, a FOPA film or an ODPA film which is the first protection film 21 is formed on the surface of the reflection layer 12 formed of, for example, aluminum and FDTS films of organic films which are the second and third protection films 22 and 23 are formed on the surface of the bottom surface portion (the transparent substrate 10) of the groove formed of, for example, glass and the surface of the absorption layer 13 formed of a mixed material of FeSi and SiO2. Accordingly, it is possible to realize the polarizing plate 1 capable of maintaining a satisfactory water-repellent function or a satisfactory oxidization prevention function even after a heat treatment and having high durability. Additionally, a method of forming the protection film 20 will be described later.

Polarizing Plate Manufacturing Method

A method of manufacturing the polarizing plate 1 according to the embodiment includes a reflection layer forming step, an absorption layer forming step, an etching step, and a protection layer forming step.

In the reflection layer forming step, the reflection layer 12 is formed on the transparent substrate 10. In the absorption layer forming step, the absorption layer 13 is formed on the reflection layer 12 formed by the reflection layer forming step. In these layer forming steps, these layers can be formed by, for example, a sputtering method or a vapor deposition method.

In the etching step, the grid-shaped convex portion 11 which is arranged on the transparent substrate 10 at the pitch shorter than the wavelength of light of a use band is formed by selectively etching the lamination structure formed by the above-described layer forming steps. Specifically, a one-dimensional grid-shaped mask pattern is formed by, for example, photolithography or nanoimprinting. Then, the grid-shaped convex portion 11 which is arranged on the transparent substrate 10 at a pitch shorter than the wavelength of light of a use band is formed by selectively etching the lamination structure. As the etching method, for example, a dry etching method using an etching gas corresponding to an etching object can be exemplified.

Figure 2A:
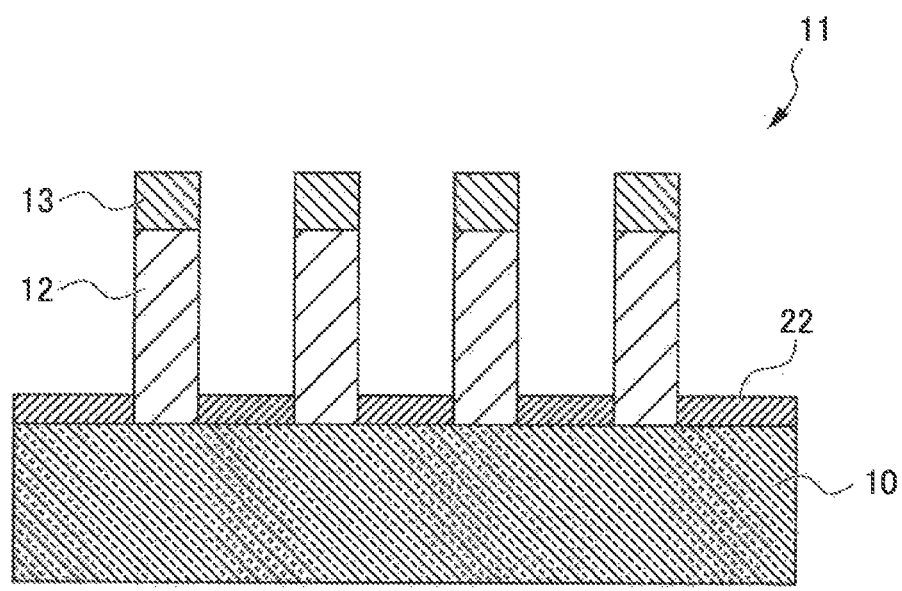
FIG. 2A is a diagram illustrating a polarizing plate manufacturing method according to the first embodiment of the invention.
Figure 2B:
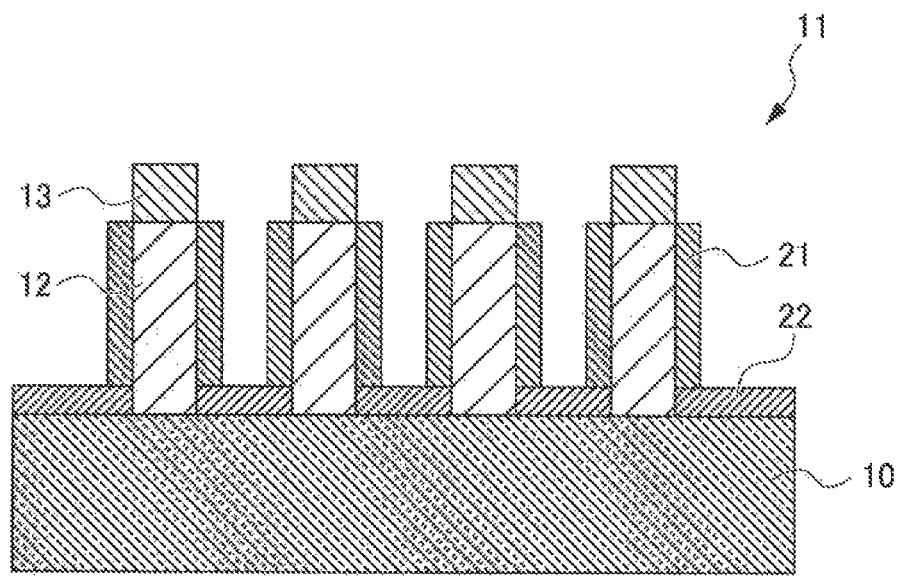
FIG. 2B is a diagram illustrating the polarizing plate manufacturing method according to the first embodiment of the invention.
Figure 2C:
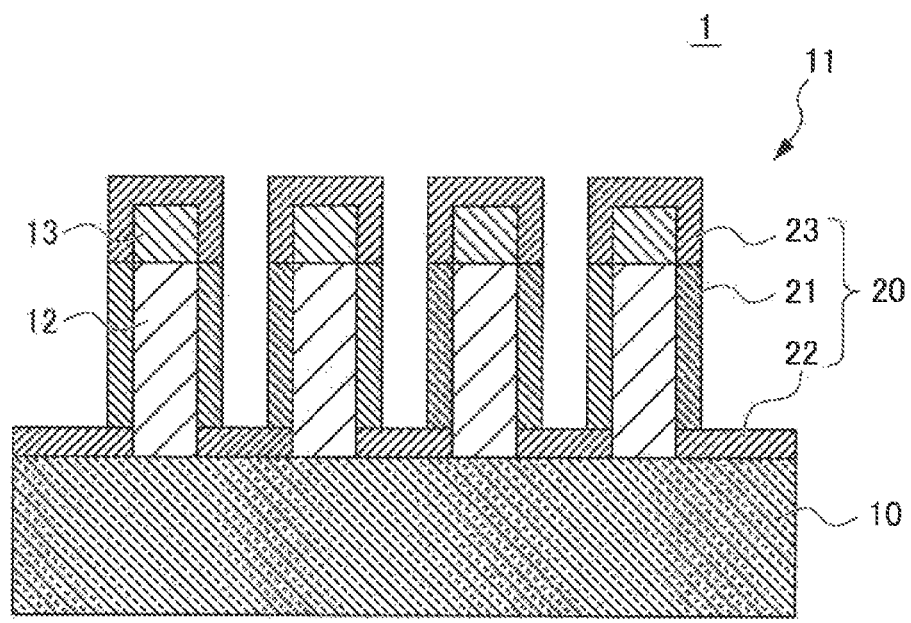
FIG. 2C is a diagram illustrating the polarizing plate manufacturing method according to the first embodiment of the invention.

Here, FIGS. 2A to 2C are diagrams illustrating a method of manufacturing the polarizing plate 1 according to the embodiment. More specifically, FIGS. 2A to 2C illustrate a protection film forming step of the method of manufacturing the polarizing plate 1 according to the embodiment. With reference to FIGS. 2A to 2C, the protection film forming step of the embodiment will be described below.

In the protection film forming step, first, as illustrated in FIG. 2A, the second protection film 22 is formed on the surface of the bottom surface portion of the groove between the grid-shaped convex portions 11 by CVD or ALD. Next, as illustrated in FIG. 2B, the first protection film 21 is formed on the surface of the reflection layer 12 by CVD or ALD after cleaning the surfaces of the reflection layer 12 and the absorption layer 13 by oxygen plasma, Ar ion etching, or the like. Next, as illustrated in FIG. 2C, the third protection film 23 is formed on the surface of the absorption layer 13 by CVD or ALD after cleaning the surface of the absorption layer 13 by oxygen plasma, Ar ion etching, or the like. Accordingly, the influence of the remaining film can be minimized.

Further, for example, when an alumina film is formed as the first protection film 21, an alumina film is first formed on the surface of the reflection layer 12 by heating the polarizing plate in an oxygen containing atmosphere after manufacturing the polarizing plate. Next, the second protection film 22 is formed on the surface of the bottom surface portion of the groove between the grid-shaped convex portions 11 by CVD or ALD. Then, the third protection film 23 is formed on the surface of the absorption layer 13 by CVD or ALD after cleaning the surface of the absorption layer 13 by oxygen plasma, Ar ion etching, or the like.

Through the above-described steps, the polarizing plate 1 according to the embodiment can be manufactured.

Optical Apparatus

The optical apparatus according to the embodiment includes the polarizing plate 1 according to the embodiment. As the optical apparatus, for example, a liquid crystal projector, a head-up display, a digital camera, and the like can be exemplified. Since the polarizing plate 1 according to the embodiment is an inorganic polarizing plate having excellent heat resistance as compared with an organic polarizing plate, the polarizing plate is suitable for a liquid crystal projector, a head-up display, and the like requiring heat resistance.

When the optical apparatus according to the embodiment includes a plurality of polarizing plates, at least one of the plurality of polarizing plates may be the polarizing plate 1 according to the embodiment. For example, when the optical apparatus according to the embodiment is a liquid crystal projector, at least one of the polarizing plates disposed on the light incident side and the light emission side of the liquid crystal panel may be the polarizing plate 1 according to the embodiment.

Second Embodiment

Figure 3:
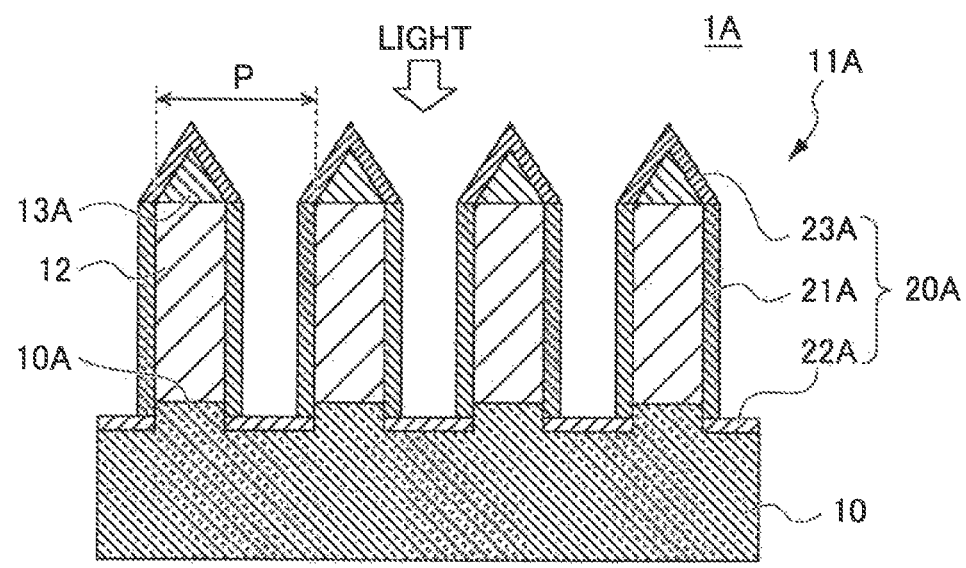
FIG. 3 is a cross-sectional schematic diagram illustrating a polarizing plate according to a second embodiment of the invention.

FIG. 3 is a cross-sectional schematic diagram illustrating a polarizing plate 1A according to a second embodiment. As illustrated in FIG. 3, the polarizing plate 1A according to the second embodiment is different from the first embodiment in that the absorption layer 13A has a taper shape, a seat 10a is formed on the transparent substrate 10, and a second protection film 22A and a third protection film 23A are formed of different materials and has the same configuration as that of the first embodiment except for these differences.

Specifically, the absorption layer 13A of the embodiment has, as illustrated in FIG. 3, a taper shape as viewed from the Y-axis direction (a predetermined direction), that is, in a cross-sectional view orthogonal to the predetermined direction. That is, the absorption layer 13A forming the front end portion of the grid has a taper shape in which a side surface is inclined in a direction in which a width becomes narrow toward the front end side (the opposite side of the transparent substrate 10) as viewed from a predetermined direction. More specifically, the absorption layer 13A of the embodiment has an isosceles trapezoidal shape. The material forming the absorption layer 13A is the same as that of the first embodiment and may be formed of a light absorption material or may be formed by a mixed layer (with homogeneous or composition gradient) of the light absorption material and the dielectric material. Alternatively, a two-layer structure of the light absorption layer and the dielectric layer may be used as in the third embodiment to be described later.

When the absorption layer 13A forming the front end portion of the grid is formed in a taper shape, it is possible to improve the transmittance of the TM wave. The reason why the transmittance of the TM wave increases in this way is because the scattering of the light incident with a non-uniform angle is suppressed when the front end of the grid is formed in a taper shape.

As illustrated in FIG. 3, the seat 10a has a rectangular shape in which the width is substantially the same as that of the reflection layer 12 as viewed from the Y-axis direction (a predetermined direction), that is, in a cross-sectional view orthogonal to the predetermined direction. However, the invention is not limited thereto. For example the seat may have a trapezoidal shape in which a side surface is inclined so that a width becomes narrow from the transparent substrate 10 toward the reflection layer 12 as viewed from the predetermined direction. The minimum width of the seat 10a at this time is set to be equal to or larger than the width of the reflection layer 12. The film thickness of the seat 10a is not particularly limited and is preferably, for example, 10 nm to 100 nm.

The seat 10a has a structure in which the dielectric film extending in a band shape in the Y-axis direction corresponding to the absorption axis is arranged on the transparent substrate 10. As a material forming the seat 10a, a material which is transparent to the light of a use band and in which the refractive index is smaller than that of the transparent substrate 10 is preferable. Among these, Si oxide such as SiO2 is preferable.

For example, the seat 10a can be formed by performing an overetching treatment on an underlying layer (not illustrated) formed of the dielectric formed on the transparent substrate 10 so as not to generate etching residues while gradually changing a balance between isotropic etching and anisotropic etching by dry etching. In this case, the seat 10a is disposed on the underlying layer formed on the transparent substrate 10.

Further, in the embodiment, the materials forming the second protection film 22A and the third protection film 23A are different from each other. Specifically, the second protection film 22A is formed by a spin on glass (SOG) film while the third protection film 23A has the same configuration as that of the third protection film 23A of the first embodiment. That is, the surface of the polarizing plate 1A of the embodiment is protected by three kinds of protection films and the protection film more suitable for the materials forming the layers can be adopted. Accordingly, the durability can be further improved.

The polarizing plate 1A of the embodiment can be manufactured by the same manufacturing method as that of the first embodiment except that a part of the etching step and the protection film forming step are different. Specifically, in the etching step, the absorption layer 13A is formed in a taper shape in which the side surface is inclined by optimizing an etching condition (a gas flow rate, a gas pressure, an output, and a transparent substrate cooling temperature). Further, in the protection film forming step, first, SOG is coated by spin coating after the polarizing plate is manufactured and then the whole is etched with oxygen plasma or F plasma. Since the SOG film on the bottom surface portion of the groove is the thickest, the SOG film on the front end side of the grid is etched earlier and the SOG film can be left only at the bottom surface portion of the groove. Next, three kinds of protection films can be formed by forming the first protection film 21A and the third protection film 23A similarly to the first embodiment.

According to the polarizing plate 1A of the embodiment, it is possible to obtain the same effect as that of the polarizing plate 1 of the first embodiment. Further, the polarizing plate 1A of the embodiment can be applied to various optical apparatuses similarly to the polarizing plate 1 of the first embodiment.

Third Embodiment

Figure 4:
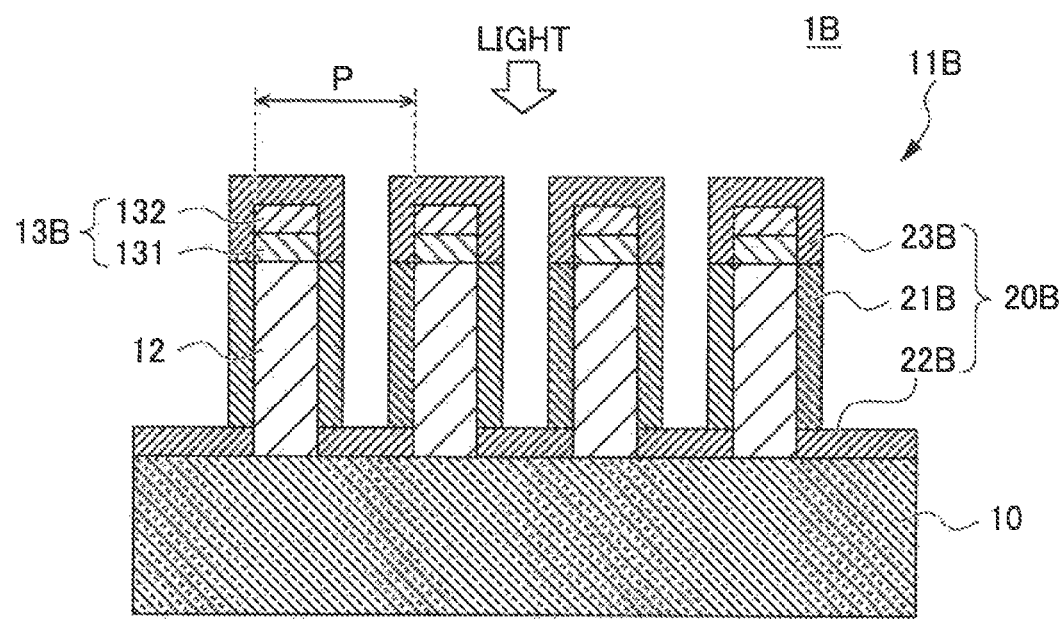
FIG. 4 is a cross-sectional schematic diagram illustrating a polarizing plate according to a third embodiment of the invention.

FIG. 4 is a cross-sectional schematic diagram illustrating a polarizing plate 1B according to a third embodiment. As illustrated in FIG. 4, the polarizing plate 1B according to the third embodiment is different from that of the first embodiment in the configuration of an absorption layer 13B. [S]pecifically, the absorption layer 13B of the polarizing plate 1B according to the third embodiment includes a dielectric layer 131 which is formed on the reflection layer 12 and is formed of a dielectric material and a light absorption layer 132 which is formed on the dielectric layer 131 and is formed of a light absorption material.

The dielectric layer 131 is formed on the reflection layer 12 and a dielectric film extending in a band shape is arranged in the Y-axis direction corresponding to the absorption axis. The dielectric layer 131 is formed with a film thickness in which the phase of the polarized light transmitted through the light absorption layer 132 and reflected by the reflection layer 12 is offset by a half wavelength with respect to the polarized light reflected by the light absorption layer 132. Specifically, the film thickness of the dielectric layer 131 is appropriately set in the range of 1 to 500 nm capable of improving an interference effect by adjusting a phase of polarized light.

As the dielectric material forming the dielectric layer 131, general materials like Si oxide such as SiO2, metal oxide such as Al2O3, beryllium oxide, and bismuth oxide, MgF2, cryolite, germanium, titanium dioxide, silicon, magnesium fluoride, boron nitride, boron oxide, tantalum oxide, carbon, or a combination thereof can be exemplified. Among these, the dielectric layer 131 is preferably formed of Si oxide.

The refractive index of the dielectric layer 131 is preferably larger than 1.0 and equal to or smaller than 2.5. Since the optical characteristics of the reflection layer 12 are also influenced by the peripheral refractive index, it is possible to control the characteristics of the polarizing plate by selecting the material of the dielectric layer 131. Further, when the film thickness or the refractive index of the dielectric layer 131 is appropriately adjusted, the TE wave reflected by the reflection layer 12 is partially reflected when being transmitted through the light absorption layer 132 so that the TE wave can be returned to the reflection layer 12 and the light passing through the light absorption layer 132 can be attenuated by interference. When the TE wave is selectively attenuated in this way, desired polarizing characteristics can be obtained.

The light absorption layer 132 is formed of the above-described light absorption material. The light absorption layer 132 can be formed by a conventionally known film forming method.

The polarizing plate 1B may include a diffusion barrier layer between the dielectric layer 131 and the light absorption layer 132. That is, in this case, the grid-shaped convex portion 11B includes the reflection layer 12, a dielectric layer 131, a diffusion barrier layer, and a light absorption layer 132 in order from the transparent substrate 10. Since the diffusion barrier layer is provided, the diffusion of light on the light absorption layer 132 is prevented. The diffusion barrier layer is formed by a metal film of Ta, W, Nb, Ti, or the like.

The polarizing plate 1B of the embodiment can be manufactured by the same method as that of the first embodiment except that the absorption layer forming step is different. In the absorption layer forming step of the embodiment, the light absorption layer is formed after the dielectric layer is formed by a conventionally known film forming method. Accordingly, the polarizing plate 1B can be manufactured.

According to the polarizing plate 1B of the embodiment, it is possible to obtain the same effect as that of the polarizing plate 1 of the first embodiment. Further, the polarizing plate 1B of the embodiment can be applied to various optical apparatuses similarly to the polarizing plate 1 of the first embodiment.

Fourth Embodiment

Figure 5:
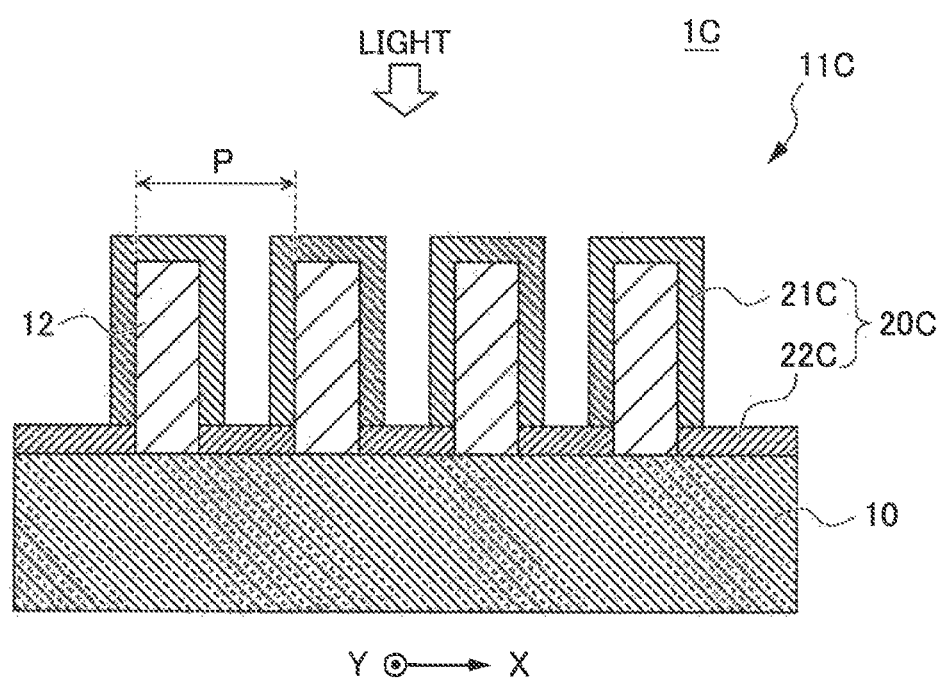
FIG. 5 is a cross-sectional schematic diagram illustrating a polarizing plate according to a fourth embodiment of the invention.

FIG. 5 is a cross-sectional schematic diagram illustrating a polarizing plate 10 according to a fourth embodiment. As illustrated in FIG. 5, the polarizing plate 10 according to the fourth embodiment has the same configuration as that of the first embodiment except that the absorption layer and the third protection film are not provided differently from the first embodiment.

According to the polarizing plate 1C of the embodiment, it is possible to obtain the same effect as that of the polarizing plate 1 of the first embodiment. Further, the polarizing plate 1C of the embodiment can be applied to various optical apparatuses similarly to the polarizing plate 1 of the first embodiment.

Further, the invention is not limited to the above-described embodiments and modification and improvement within the scope of achieving the object of the invention are included in the invention. For example, the application of the polarizing plate of the invention is not limited to the liquid crystal projector. The polarizing plate can be used for various applications as a polarizing plate with high transmittance power of polarized light in the transmission axis direction.

EXPLANATION OF REFERENCE NUMERALS 1, 1A, 1B, 1C POLARIZING PLATE
10 TRANSPARENT SUBSTRATE
10a SEAT
11, 11A, 11B, 11C GRID-SHAPED CONVEX PORTION
12 REFLECTION LAYER
13, 13A, 13B ABSORPTION LAYER
20, 20A, 20B, 20C PROTECTION FILM
21, 21A, 21B, 21C FIRST PROTECTION FILM
22, 22A, 22B, 22C SECOND PROTECTION FILM
23, 23A, 23B THIRD PROTECTION FILM
131 DIELECTRIC LAYER
132 LIGHT ABSORPTION LAYER
P PITCH OF GRID-SHAPED CONVEX PORTION

What is claimed is:

1. A polarizing plate with a wire grid structure, comprising:
a transparent substrate; and
a grid-shaped convex portion which is arranged on the transparent substrate at a pitch shorter than a wavelength of light of a use band, extends in a predetermined direction, and includes a reflection layer formed of a light reflective material,
wherein the grid-shaped convex portion includes the reflection layer and an absorption layer including a light absorption material in order from the transparent substrate,
wherein a surface of the grid-shaped convex portion and a surface of a bottom surface portion of a groove formed between the grid-shaped convex portions are provided with a protection film which covers the surfaces thereof,
wherein the protection film is formed by three kinds or more of protection films including an organic film formed of an organic material,
wherein the protection film includes a first protection film which is formed by a single layer to directly cover a surface of the reflection layer, a second protection film which is formed by a single layer to directly cover the surface of the bottom surface portion of the groove, and a third protection film which is formed by a single layer to cover a surface of the absorption layer, and is formed by the organic film,
wherein the first protection film is formed by a phosphonic acid-based water-repellent film,
wherein the second protection film is formed by perfluorodecyltriethoxysilane, and
wherein the absorption layer further includes a dielectric material and is formed by a mixed layer of the light absorption material and the dielectric material, so that a content ratio of the light absorption material increases as a distance from the reflection layer increases.

2. The polarizing plate according to claim 1,
wherein the second protection film and the third protection film are formed of the same material.

3. An optical apparatus comprising:
the polarizing plate according to claim 1.

* * * * *